United States Patent [19]
Wallace et al.

[11] Patent Number: 6,163,137
[45] Date of Patent: Dec. 19, 2000

[54] ROTARY INDUCTION MACHINE HAVING CONTROL OF SECONDARY WINDING IMPEDANCE

[75] Inventors: Alan K. Wallace, Corvallis, Oreg.; James A. Oliver, Corona, Calif.

[73] Assignee: Heller-DeJulio Corporation, Pleasanton, Calif.

[21] Appl. No.: 09/376,675

[22] Filed: Aug. 18, 1999

Related U.S. Application Data

[63] Continuation-in-part of application No. 09/064,977, Apr. 23, 1998.

[51] Int. Cl.[7] .................................................. H02H 7/06
[52] U.S. Cl. .......................... 322/20; 322/32; 322/47; 322/29; 318/821; 318/822; 318/823
[58] Field of Search ............................ 322/20, 32, 47, 322/29; 318/821, 822, 825, 827, 829, 823

[56] References Cited

U.S. PATENT DOCUMENTS

| | | | |
|---|---|---|---|
| 455,067 | 6/1891 | Tesla | 310/166 |
| 610,025 | 8/1898 | Bradley | 310/166 |
| 853,465 | 5/1907 | Mershon | 310/166 |
| 911,147 | 2/1909 | Mershon | 322/47 |
| 1,837,563 | 12/1931 | Mayer | 310/166 |
| 1,854,447 | 4/1932 | Chromy | 310/166 |
| 2,160,594 | 5/1939 | Krebs | 171/223 |
| 2,642,808 | 6/1953 | Thomas | 103/126 |
| 2,648,808 | 8/1953 | Tiede | 318/229 |
| 2,881,276 | 4/1959 | Mintz et al. | 200/61.45 |
| 3,774,883 | 11/1973 | Ostrom | 254/172 |
| 3,969,659 | 7/1976 | Thode | 318/237 |
| 4,006,399 | 2/1977 | Studtmann | 322/47 |
| 4,019,104 | 4/1977 | Parker | 318/195 |
| 4,206,345 | 6/1980 | Maass et al. | 219/524 |
| 4,206,395 | 6/1980 | Okuyama et al. | 318/716 |
| 4,242,628 | 12/1980 | Mohan et al. | 322/35 |
| 4,532,465 | 7/1985 | Renard | 318/814 |
| 4,642,545 | 2/1987 | Lewus | 318/749 |
| 4,833,584 | 5/1989 | Divan | 363/37 |
| 4,959,573 | 9/1990 | Roberts | 310/68 R |
| 5,029,265 | 7/1991 | Staats | 318/729 |
| 5,525,894 | 6/1996 | Heller | 322/20 |
| 5,587,643 | 12/1996 | Heller | 318/821 |

*Primary Examiner*—Elvin Enad
*Assistant Examiner*—Burton S. Mullins
*Attorney, Agent, or Firm*—Flehr Hohbach Test Albritton & Herbert LLP

[57] ABSTRACT

A rotary induction machine in which operating characteristics of the machine are controlled by adding impedance elements to the rotor windings in which the impedance elements are stationary and connected to the rotor windings by a rotary transformer.

4 Claims, 7 Drawing Sheets

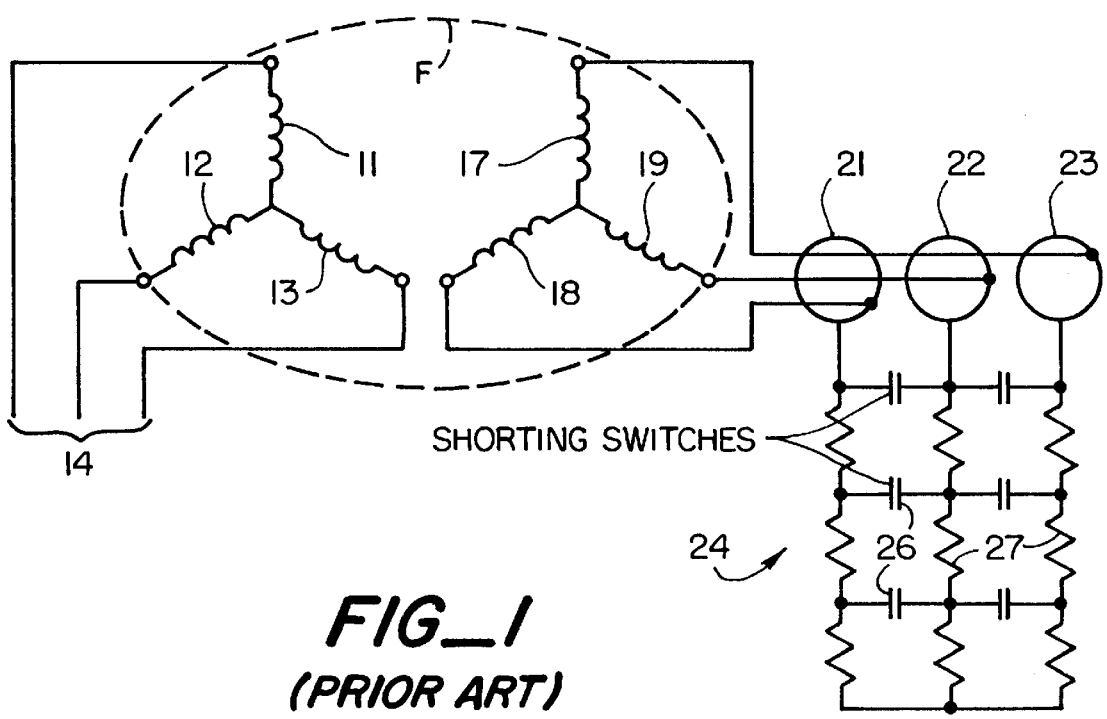
FIG_1
(PRIOR ART)
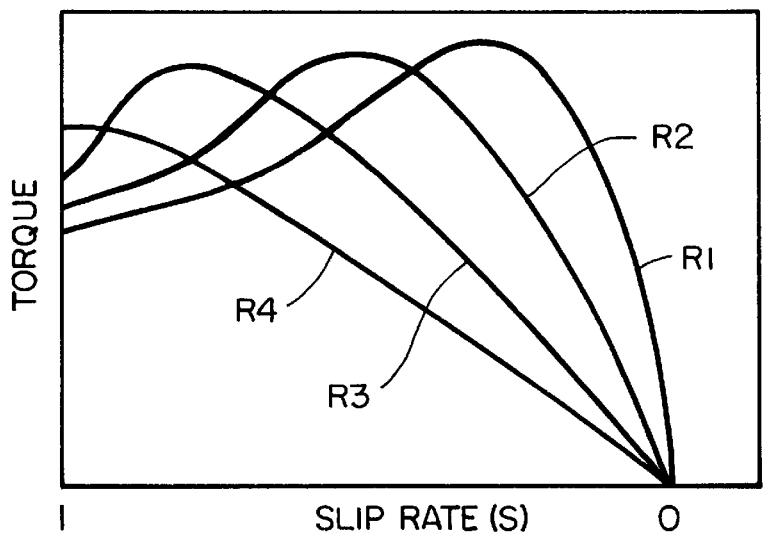
FIG_2
(PRIOR ART)

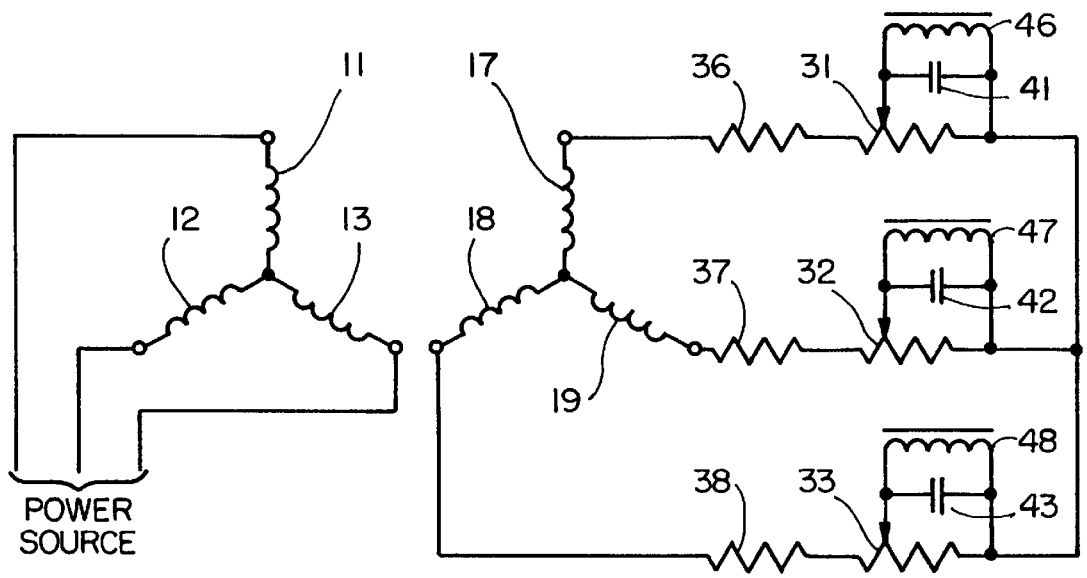
FIG_3
*(PRIOR ART)*
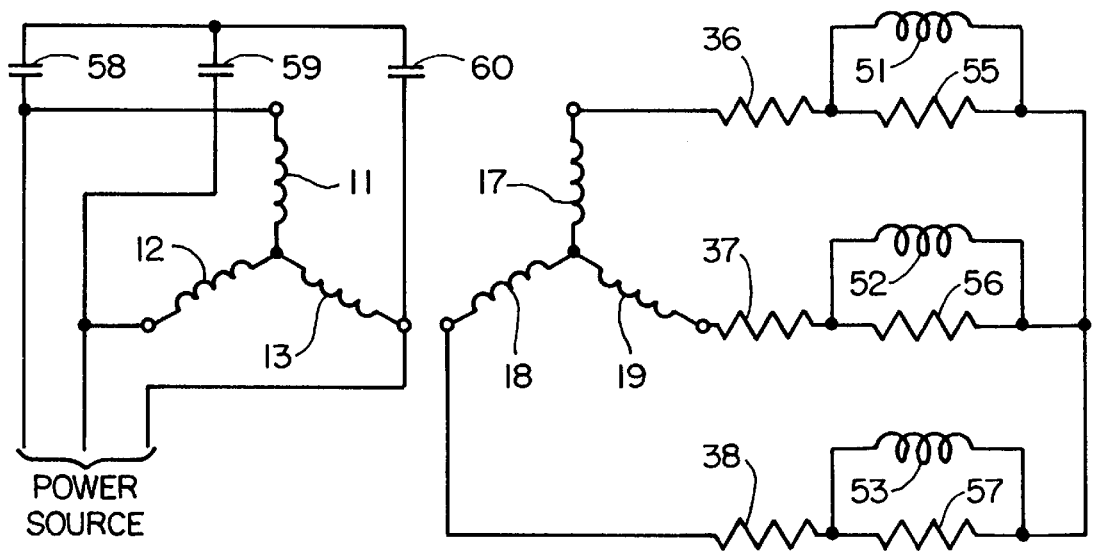
FIG_4

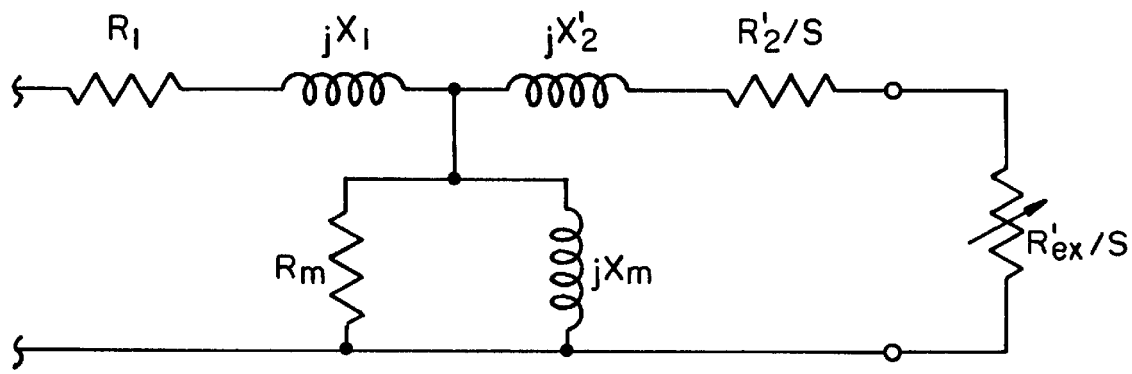
FIG_5
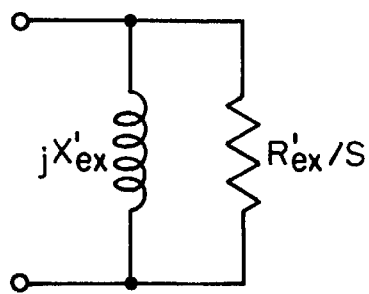
FIG_6
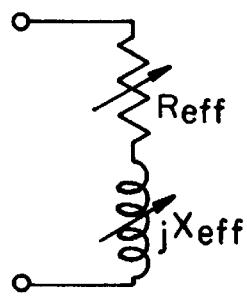
FIG_7

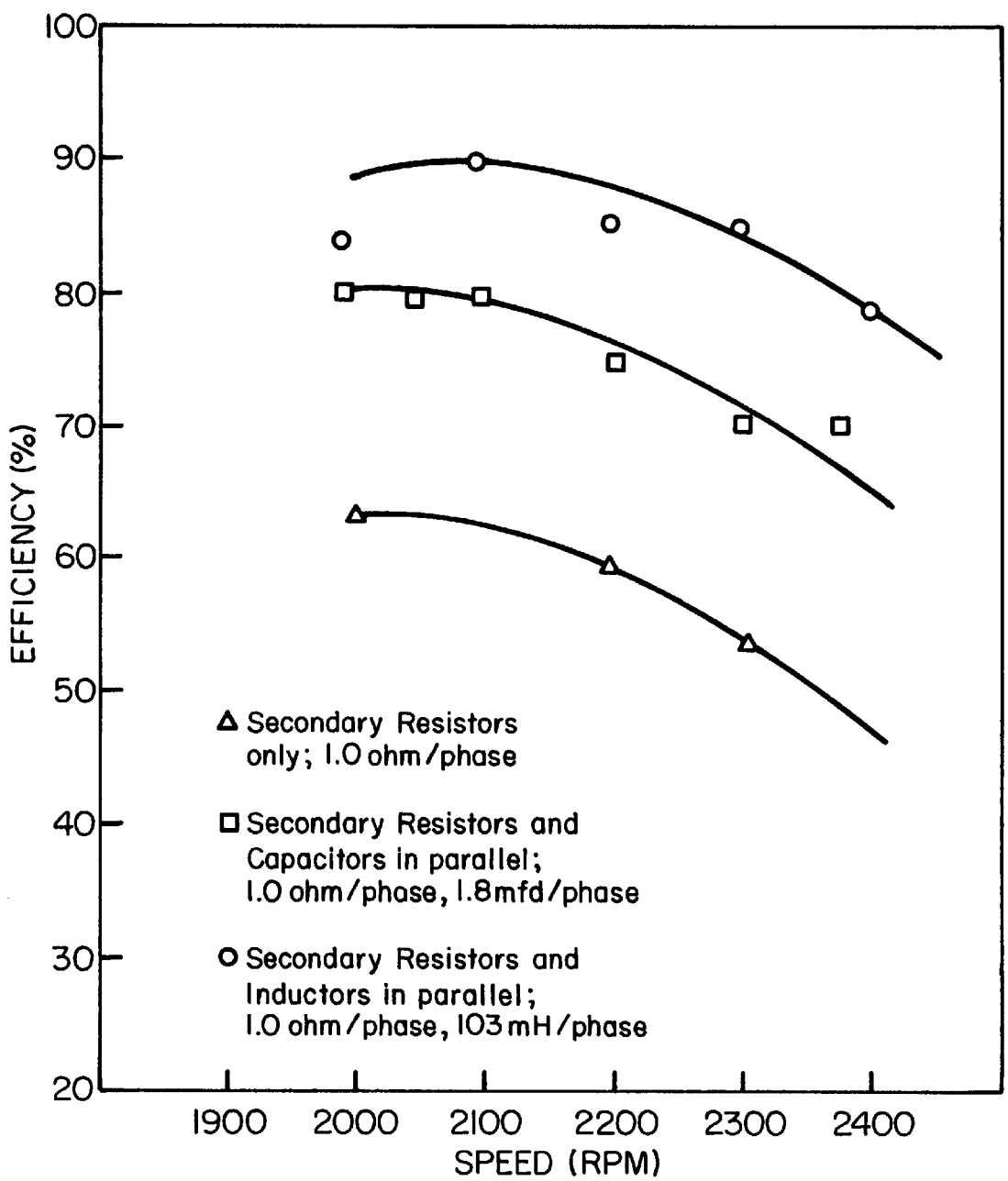
FIG_8

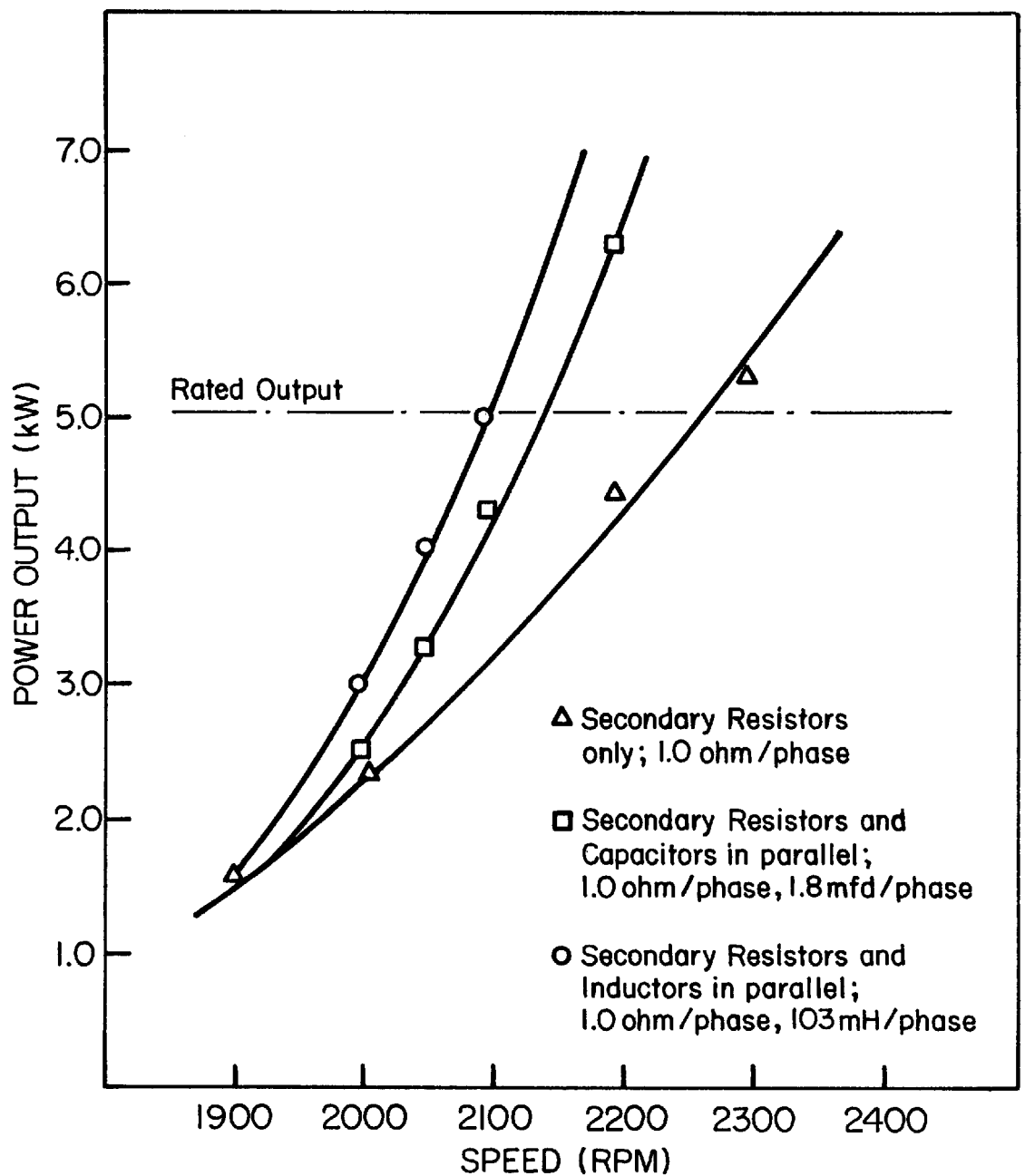
FIG_9

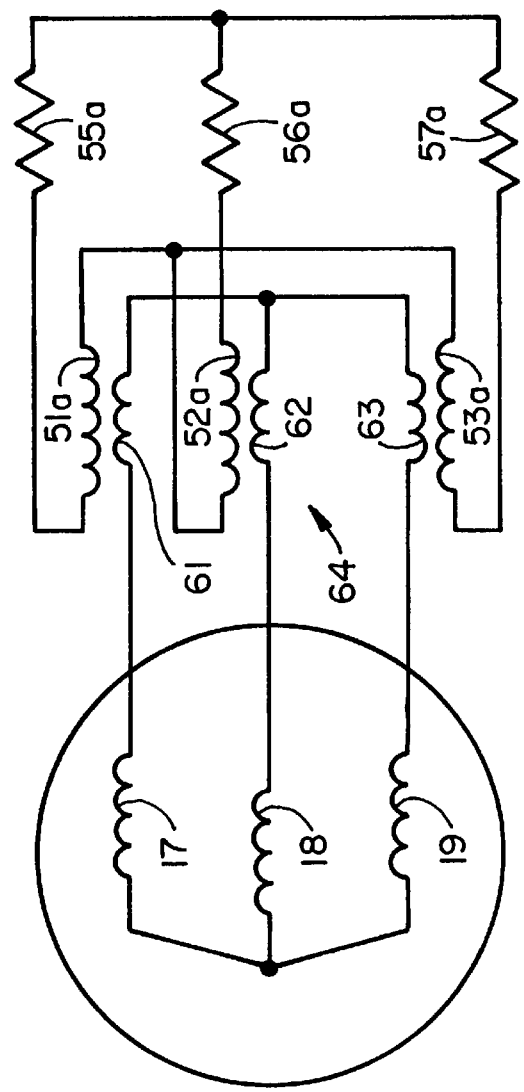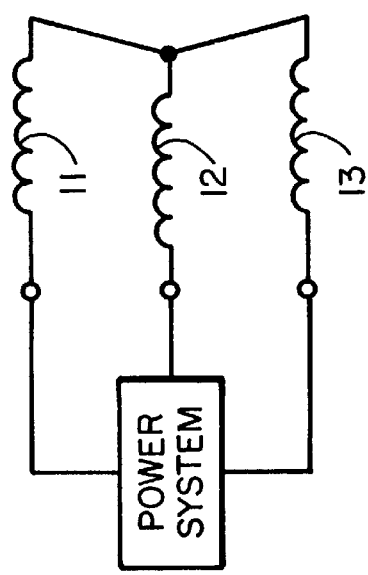
FIG_10

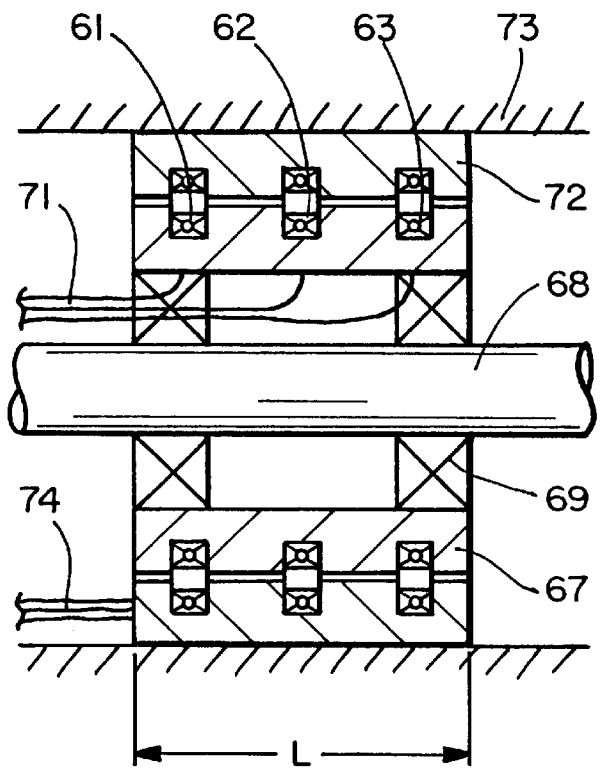
FIG_11
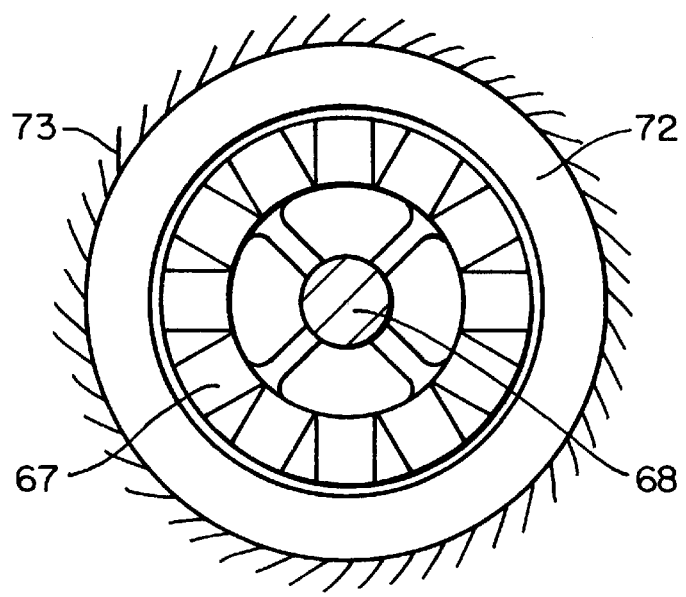
FIG_12

ROTARY INDUCTION MACHINE HAVING CONTROL OF SECONDARY WINDING IMPEDANCE

RELATED APPLICATIONS

This application is a continuation-in-part of application Ser. No. 09/064,977 filed Apr. 23, 1998, which was allowed on May 24, 1999.

FIELD OF THE INVENTION

This invention relates generally to rotary induction machines of the type having a wound rotor and more particularly to wound rotor induction motors and generators in which the impedance of the secondary is controlled by inductively coupling inductors and resistors in parallel and in series with the rotor secondary windings.

BACKGROUND OF THE INVENTION

In induction machines the currents in the secondary winding (usually the rotor) are created solely by induction. These currents result from voltages induced in the secondary windings by rotating magnetic fields in the primary winding which arise from the application of line voltages thereto. These fields rotate at a speed, called synchronous speed, which is determined by the frequency of the applied voltage and the number of poles.

When the machines are operated as a motor, the rotor rotates at speeds below the synchronous speed. The difference in speed between synchronous and rotor speed is referred to as the slip speed, usually expressed as a per unit or percentage of the synchronous speed.

The rotor windings are generally connected to slip rings to which adjustable resistances can be connected in series with the windings. These resistances limit the secondary currents during "start" of operation as a motor. As the motor picks up speed, the secondary resistance is gradually reduced whereby the efficiency increases. The value of the resistance is selected to provide selected power and speed range of the generator, however, this method of speed control is very inefficient.

When the rotor is driven at above the synchronous speed, the machine acts as a generator. With resistance in the secondary windings, the output power can be maintained somewhat constant over a narrow range of rotor speeds.

For the past thirty years or more, when driving a generator with various types of prime movers, the speed of the electrical generator was kept nearly constant. Various mechanical methods for controlling speed have been used, depending on the prime mover. When using an alternator with dc excited fields for 60 Hz output frequency, the speed must be kept constant to a very close tolerance, i.e. to within one revolution per minute of 1800 to 3600 revolutions of the per minute synchronous speed. When using a squirrel-cage induction generator, the most common generator for wind turbines, operation at a small percent above synchronous speed is necessary. If, inadvertently, a higher torque is supplied by the prime mover, the generator completely releases its load and a "runaway condition" exists. Under such circumstances, the prime mover, a wind or steam turbine, or a diesel, may race to destruction in a very few seconds, if not controlled.

However, variable speed generators are desirable because they allow wind turbines to follow the changes in wind velocity and to thereby reduce wear in the gear box which matches generator speed to turbine speed. Variable speed is also needed to eliminate voltage flicker caused by power surges from wind gusts.

For variable speed wind generators, power electronics may be used to control rotor voltage and frequency using the wound rotor induction machine. Power electronic controls tend to be complex with many components, they require feed-back circuits to match injected rotor frequency to turbine speed, and they may produce troublesome electrical harmonics. For wave generators, fixed resistors are being used to provide variable speed, with very poor efficiency.

In U.S. Pat. No. 2,648,808 there is described a motor having a wound primary winding (stator) in which the effective impedance of the primary windings is varied to improve the torque-speed characteristics of the motor. More particularly, the power factor of the motor is improved by controlling the impedance of the primary windings by adding thereto external series impedances.

U.S. Pat. Nos. 5,525,894 and 5,587,643, incorporated herein in their entirety by reference, use secondary resistors and secondary capacitors for variable speed wound rotor generator control. In the first patent, they are used for load limiting and, in the second patent, they are used for increased power output and improved efficiency.

The resistance is normally connected to the rotors by slip rings and carbon brushes. It is desirable to eliminate the carbon brushes and slip rings because they have been found to be a source of many problems. The carbon brushes function best with a current density of about 60 amperes per square inch and with a certain amount of humidity in the surrounding atmosphere. With a fixed current density of about this value and reasonable humidity, the transfer of current between slip ring and brush is efficient. An interchange of electrons takes place between the surfaces of the metallic slip rings and the carbon brushes which develops a lubricating film. This film allows current transfer with a very low voltage drop, with no heating, and with little friction between the fixed brushes and rotating rings.

However, if the current density becomes too low, or if the humidity becomes too low, the lubricating film does not develop, and the voltage drop, heating and friction all increase. The carbon brush now acts as an abrasive against the slip ring, wearing both the slip ring and the brush. Carbon and metallic dust is created which conducts electricity and winding failures can result.

With wind and wave generators, the generator load varies depending on the amount of wind or wave activity, so it is impossible to maintain a constant current density in the carbon brushes. The wind and wave generators are not readily accessible. Wind generators are usually mounted high on a tower, and wave generators are at sea. Accordingly, there are very high maintenance costs associated with checking on the condition of the brushes and rings, replacing worn brushes, resurfacing slip rings, cleaning the windings of carbon dust, and in repairing failures.

OBJECTS AND SUMMARY OF THE INVENTION

It is a general object of this invention to provide an improved rotary induction machine.

It is a further object of this invention to provide a wound rotor induction generator in which inductors are connected directly across and in series with the secondary winding to improve the efficiency.

It is a further object of this invention to provide an induction generator which can be operated efficiently over a narrow range of rotor speeds, on the order of 10–15% of rated speed, but at line frequency.

An objection for power generation is to get maximum power output, high efficiency, system robustness and low cost. The generator of the present invention can deliver power over a reasonable speed range and at better efficiency than known variable-speed induction generators, which are controlled by rotor-connected resistors. The generator maintains its output frequency over a variable speed range. The generator is ideally suited for "peaking" requirements with diesel, steam or gasoline type prime movers and for wind and wave powered generators.

Since the control elements of this invention are passive and have fixed values of resistance and inductance, it is possible with a rotary transformer to fixedly mount these circuit elements. Inductive coupling eliminates the commonly used slip rings and carbon brushes which are a source of failures and maintenance costs.

BRIEF DESCRIPTION OF THE DRAWINGS

FIG. 1 is a schematic diagram of an induction motor in accordance with the prior art.

FIG. 2 is a graph showing power output as a function of slip for the prior art device shown in FIG. 1.

FIG. 3 is a schematic diagram of a wound rotor induction machine in accordance with the prior art.

FIG. 4 is a schematic diagram of a wound rotor induction machine in accordance with the present invention.

FIGS. 5, 6 and 7 are equivalent circuits used to calculate the values for external resistance and reactance.

FIG. 8 shows generator efficiency and power factor improvement for the embodiment of FIG. 4 compared to prior art.

FIG. 9 shows the speed-power output curve of the embodiment of this invention and that of the prior art.

FIG. 10 is a schematic diagram of the impedance elements connected to the rotor by a rotary transformer.

FIG. 11 is a cross-sectional view of a rotary transformer for connecting stationary external impedance elements to a rotating rotor.

FIG. 12 is an end view of the rotary transformer of FIG. 9.

DESCRIPTION OF THE PREFERRED EMBODIMENT

The prior art induction machine shown in FIG. 1 includes primary windings 11, 12, 13 shown connected in a "Y" configuration to the voltage supply 14. The windings are wound in the stator of the machine in accordance with well known winding practices. The voltage applied from the power system produces currents in the windings which generate a primary field "F" which is coupled to the wound rotor including windings 17, 18, 19. The rotor is mechanically attached to a shaft, not shown. Each of the secondary windings is connected to a slip ring 21, 22, 23, respectively, which in turn is connected to a resistive network 24 which includes shorting switches 26 and resistors 27.

As described above, all switches are open as voltages is first applied to start the machine. The resistance in series with the rotor windings is maximum, thereby limiting the starting current. As the rotor speed increases, the switches are sequentially closed to thereby remove more and more resistance, thereby allowing the speed to increase and provide maximum torque at higher speeds. The current reduces because the relative speed between the primary magnetic field and the rotor windings is reduced, thereby reducing the induced voltage.

Referring particularly to FIG. 2, the curves show the torque as a function of slip rate. It is seen that with the resistance R1, the maximum power is achieved at the high slip rate or rotor speed and that as the resistance is decreased, higher torque Is achieved at lower slip rates. The efficiency is substantially higher when the resistance is low because the resistive losses in the rotor secondary circuit are minimized.

The prior art teaches that the operating characteristics of an induction motor or generator are substantially improved by adding in the secondary windings a reactive impedance. A prior art machine is shown in FIG. 3. Potentiometers 31, 32 and 33 are connected in series, one with each winding, to provide adjustable resistance. The winding resistance is shown at 36, 37 and 38. The potentiometer wiper is connected to a parallel combination of a bridging capacitor 41, 42 and 43 and an inductor 46, 47 and 48. Prior art shows that connecting capacitors in parallel with a secondary resistor improves the power output and improves the efficiency.

We have discovered that by connecting the inductors 51, 52 and 53 directly across resistors 55, 56 and 57 and in series with the rotor windings the efficiency of the machine is substantially improved over that obtained with capacitors. The efficiency of the machine is improved to the extent that it is comparable to the efficiency being obtained with high efficiency power electronic circuits, but without the complexity, potential for failure, feedback circuits, electrical harmonics and high capital cost of the latter. In the present invention, the inductance for the rotor circuit inductors 51, 52 and 53 is obtained from the effective inductance of the rotary transformer windings 51, 52, 53, FIGS. 9–12, to be presently described. The effective inductance of the transformer is connected in parallel with the stationary resistors 55, 56, 57, capacitors 58, 59 and 60 in the primary provide power factor improvement.

The secondary inductors, in this case the rotary transformer effective inductance, when connected in parallel with the secondary resistors, act as a variable shunt around the secondary resistors. At rotor speed slightly above synchronous speed, the frequency induced in the rotor circuit is small so the inductor acts as a small resistor in parallel with the secondary resistor, reducing the net value of secondary resistance according to the equation for parallel resistors.

$$R_{net} = \frac{R_L R_{ext}}{R_L + R_{ext}}$$

where:

$R_{net}$ is the net effective resistance of the external rotor circuit;

$R_L$ is the resistance of the inductor; and $R_{ext}$ is the resistance of the external secondary resistor.

With low net external resistance, the rotor $I^2R$ loss is reduced and the efficiency is improved.

As rotor speed is increased, the inductive reactance is increased according to $$X_L = 2\pi f L$$

where:

$X_L$ is the effective inductive reactance of the rotary transformer, in ohms;

f is the rotor frequency, in Hertz (slip times the stator frequency); and

L is the inductance, in Henries, of the inductor.

As the inductive reactance increases with rotor speed, the rotor speed and torque are controlled by the inductive impedance of the matrix consisting of the external resistor and the parallel inductor with its own resistance. By carefully selecting the values of external resistance, which is usually on the order of one ohm, or a fraction of an ohm, for 15% speed range while keeping the rotor losses low, and the reactance of the inductor, the machine will have the requisite speed range and high efficiency.

The amount of inductive reactance that is needed is calculated by computer program using the equivalent circuit of the generator, FIGS. 5, 6 and 7, including the external resistance and inductance, and including the resistance of the rotary transformer. With reference to the Figures, the following symbols are used:

$R_1$=stator winding resistance;
$X_1$=stator winding reactance;
$R_m$=magnetization loss reactance;
S=rotor slip;
$R'_2$=rotor winding resistance;
$X'_2$=rotor winding reactance;
$R'_{ext}$=external resistor resistance;
$X'_{Lext}$=external reactor reactance; and
$R'_{Lext}$=external reactor resistance.

Quantities identified with ' are referred to the stator by multiplying the values by the stator to rotor turns ratio squares $(n_1/n_2)^2$, and the reactance values are at line (stator) frequency.

From an analysis of the equivalent circuit of FIG. 5, it can be shown, to a reasonable level of approximation, that the slip at which peak torque occurs is given by $$Sp = \pm \frac{R_T}{X_T} \quad (1)$$

in which the positive sign is for motor operation and the negative sign is for generator operation, where $$R_T = (R'_2 + R'_{ex}) \quad (2)$$

and $$X_T = (X_1 + X'_2) \quad (3)$$

Equation (1) is linear and can be solved analytically. If the values of $X_T$, $R'_2$ are known then a suitable value of $R'_{ex}$ can be derived for a required slip.

If, now, the adjustable external resistor, $R'_{ex}$, is replaced by a parallel combination of fixed resistor and inductor of reactance $X'_{ex}$ at line frequency (FIG. 6) they can be replaced by the equivalent series combination shown in FIG. 7, in which $$R_{eff} = \frac{\frac{R'_{ex}}{S}(X'_{ex})^2}{\left(\frac{R'_{ex}}{S}\right)^2 + (X'_{ex})^2} \quad (4)$$

and $$X_{eff} = \frac{\left(\frac{R'_{ex}}{S}\right)^2 X'_{ex}}{\left(\frac{R'_{ex}}{S}\right)^2 + (X'_{ex})^2} \quad (5)$$

Thus, it is evident that the effective series resistance is continually modified as the generator speed (and slip, S) change. The total machine resistances and reactances are given by $$R_T = R'_2 + \frac{R'_{ex}(X'_{ex})^2}{\left(\frac{R'_{ex}}{S}\right)^2 + (X'_{ex})^2} \quad (6)$$

and $$X_T = X_1 + X'_2 + \frac{(R'_{ex})^2 X'_{ex}}{\left(\frac{R'_{ex}}{S}\right)^2 + (X'_{ex})^2} \quad (7)$$

Analysis of the equivalent circuit, neglecting stator resistance, shows that to a reasonable approximation the available torque (where torque=power/speed) of the machine is given by $$T = \left(\frac{V^2}{2\pi N_S X_T}\right)\left(\frac{\left(\frac{R_T}{X_T}\right)S}{\left(\frac{R_T}{X_T}\right)^2 + S^2}\right) \quad (8)$$

where V=stator applied voltage, and $N_s$=synchronous speed in revolutions per second.

Because both $R_T$ and $X_T$ are functions of slip in equations (6) and (7) when these are substituted into, equation (1) it becomes highly non-linear and cannot be solved analytically. However, by computer program of the equivalent circuit, using external elements $R_{eff}$ and $X_{eff}$, as given by equations (4) and (5), the performance of the generator system can be predicted, and suitable values for both $R_{ex}$ and $X_{ex}$ can be determined if the required maximum slip range is known. As a first approximation the external resistance is calculated as the value needed to produce the required range without the parallel inductor. This starting value is always too large due to the normal operating, condition of the machine being at a lesser slip than the maximum torque condition. The initial value of the external reactance is selected as being approximately an order of magnitude greater than the magnetization reactance of the generator itself. Using these initial values, the calculation process of the equivalent circuit is repeated with decreasing external resistance values until the machine rated current is reached at the highest slip needed for the range of operation.

A commercial three-phase 1460 volt, 1715 rpm, 5 kW generator purchased from Sterling Electric, Serial No. 35,206, was tested with:

a) conventional resistor control with 1 ohm in each rotor phase;

b) resistor and parallel capacitor control, with 1 ohm and 1800 microfarads of capacitance per phase, in accordance with prior art; and c) resistor and parallel inductor control, with 1 ohm and 0.013 henries per phase, in accordance with the embodiment of this patent.

As can be seen in the test curves of efficiency vs. speed (FIG. 8) this invention provides a previously unheard of level of high efficiency for the wound rotor induction generator, without electronic control, when operating at variable speed, above synchronous speed. The resistor/reactor control also was shown to improve the power factor. Further improvement in power can be obtained by applying a small amount of power factor correction capacitors to the stator leads. The efficiency of the resistance/inductance scheme was shown to be the best, in fact, equal to that of generator control schemes using state-of-the-art power electronic circuits.

For wind turbines, a speed range of 15% is adequate. This test data shows that 15 to 20% speed range is practical with efficiency levels of 89 to 90%, and up to 92%.

Power vs. speed characteristics for the three rotor resistance/impedance combinations that were tested are shown in FIG. 9. This data demonstrates that the high efficiency of the embodiment of this patent is obtained without significant loss of power output over the speed range.

The resistor/reactor control, described herein, allows the output of the generator to match the input to the generator from the prime mover. The prime mover determines the generator speed and torque loading. There are no feedback controls associated with this generator. The prime mover may operate with variable speed, as is the case of wind and wave turbines, or it may operate with fixed speed as might be the case of a steam turbine, a gas turbine, or an engine prime mover.

If it were desirable to control the speed of the generator by feedback control, the fixed value reactance used for the external inductor can be replaced with a variable value reactor, such as a saturatable-core reactor, which would allow generator speed to be controlled by a feedback signal.

In accordance with another feature of the present invention, external impedances including resistors and inductors in the present disclosure and in U.S. Pat. Nos. 5,525,894 and 5,589,643, incorporated herein by reference, are inductively coupled to the rotating rotor by a transformer coupling thereby eliminating the problems introduced by slip rings and brushes.

Referring first to FIG. 10, the generator stator windings 11, 12 and 13 are shown connected to a power source. The rotor windings 17, 18 and 19 are shown connected to the primary windings 61, 62 and 63 of a rotary transformer 64. The primary windings rotate with the rotor and are coupled to the transformer secondary windings 51a, 52a and 53a. The transformer secondary windings may serve as the necessary inductance, or additional inductance can be added in series. The stationary resistors 55a, 56a and 57a are connected in parallel with the inductors. As a result, the rotor is inductively coupled to the stationary impedance elements.

Referring to FIGS. 11 and 12, the transformer includes primary member windings 61, 62 and 63 wound on a rotor member 67 affixed to shaft 68 by spokes 69. The windings are connected to the generator rotor windings 17, 18 and 19 via leads 71. The secondary of the windings 51a, 52a and 53a are wound on the cylindrical member 72 affixed to the generator frame 73. Leads 74 connect the stationary resistors 55a, 56a and 57a or other impedance elements to the fixed windings 51a, 52a and 53a. Thus, the fixed external resistors/inductors, or other fixed impedance elements, are inductively coupled to the rotor windings.

The foregoing description of a specific embodiment of the present invention is presented for the purposes of illustration and description. It is not intended to be exhaustive or to limit the invention to the precise form disclosed, obviously many modifications and variations are possible in view of the above teachings. The embodiment was chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A rotary induction generator comprising a stator having wound thereon windings defining a three-phase stator;

a rotor mounted for rotation in said stator and having wound thereon three rotor windings defining a three-phase rotor;

said three-phase stator windings adapted to be connected to a source of electrical power and serving as excitation windings whereby the applied voltage causes current to flow in said three-phase windings and provide a rotating magnetic field;

said other three-phase rotor windings are coupled to said magnetic field whereby currents are produced in both said rotor and stator windings in proportion to the speed of rotation of the rotor, which is in turn in proportion to the speed and power of the prime mover;

a rotary transformer, the primary windings of which are mounted to rotate with the generator rotor, is connected in series with the generator rotor windings, and the secondary windings of which are connected in parallel with resistive means.

2. A rotary induction generator as in claim 1 in which effective inductance of the rotary transformer as seen by the generator rotor windings is selected to improve the efficiency of the generator.

3. A rotary induction generator as in claim 2 in which the effective inductance is selected to provide efficiency over a speed range of up to 15% of rated synchronous speed.

4. A rotary induction generator having polyphase stator and rotor windings, a polyphase rotating transformer having rotating primary windings and stationary secondary windings, said generator rotor windings connected to the rotating polyphase primary windings of the rotary transformer, a resistor connected to each of the stationary polyphase secondary windings of the rotary transformer, whereby the effective inductance of the rotary transformer as seen by the generator rotor windings is selected to maximize the efficiency of the generator over a narrow speed range above rated synchronous speed, and wherein the speed and power are determined by the ohmic value of the external resistor.

* * * * *